(12) United States Patent
Bledsoe

(10) Patent No.: US 7,406,817 B2
(45) Date of Patent: Aug. 5, 2008

(54) MOWER DISCHARGE SLIDING DOOR

(76) Inventor: Danny Bledsoe, 71 Callabell Rd., Louisville, KY (US) 40206

(*) Notice: Subject to any disclaimer, the term of this patent is extended or adjusted under 35 U.S.C. 154(b) by 0 days.

(21) Appl. No.: 11/801,692

(22) Filed: May 10, 2007

(65) Prior Publication Data

US 2007/0261380 A1  Nov. 15, 2007

(51) Int. Cl.
*A01D 67/00* (2006.01)
(52) U.S. Cl. ................................... 56/320.2
(58) Field of Classification Search ............... 56/320.2, 56/202, 17.4, 16.6, 320.1, DIG. 18, 7, DIG. 15
See application file for complete search history.

(56) References Cited

U.S. PATENT DOCUMENTS

| | | | |
|---|---|---|---|
| 2,659,191 A | | 11/1953 | Miller et al. |
| 2,687,607 A | | 8/1954 | Sewell |
| 3,132,457 A | * | 5/1964 | Slemmons ............... 56/202 |
| 3,423,918 A | * | 1/1969 | Siwek ..................... 56/202 |
| 3,646,739 A | | 3/1972 | Dahl |
| 3,706,190 A | * | 12/1972 | Taub ....................... 56/13.4 |
| 3,750,378 A | * | 8/1973 | Thorud et al. ........... 56/10.5 |
| 4,135,351 A | * | 1/1979 | Akgulian ................. 56/255 |
| 4,189,903 A | | 2/1980 | Jackson et al. |
| 4,189,904 A | | 2/1980 | Paker |
| 4,214,424 A | * | 7/1980 | Gobin ..................... 56/202 |
| 4,312,174 A | | 1/1982 | Vanderhoef |
| 4,326,370 A | * | 4/1982 | Thorud .................... 56/202 |
| 4,435,949 A | * | 3/1984 | Heismann ................ 56/320.2 |
| 4,890,446 A | | 1/1990 | Israel |
| 5,325,657 A | | 7/1994 | Bevis |
| 5,410,867 A | | 5/1995 | Plamper et al. |
| 5,488,821 A | | 2/1996 | McCunn et al. |
| 5,581,987 A | | 12/1996 | Schuyler |
| 6,006,506 A | * | 12/1999 | Dawson .................. 56/320.2 |
| 6,843,048 B2 | | 1/2005 | Osborne |
| 6,862,875 B2 | * | 3/2005 | Iida et al. ................ 56/320.2 |
| 2004/0083702 A1 | * | 5/2004 | Strange et al. .......... 56/320.2 |
| 2004/0112031 A1 | * | 6/2004 | Dickey .................... 56/320.2 |

OTHER PUBLICATIONS

US 4,398,011, 7/03/1990, Perina (withdrawn).

* cited by examiner

*Primary Examiner*—Árpád Fábián-Kovács
(74) *Attorney, Agent, or Firm*—Carrithers Law Office, PLLC; David W. Carrithers

(57) ABSTRACT

An industrial grade mower that has a cutting blade rotating in horizontal plane under an inverted dish like housing that has a cuttings discharge opening in a side wall of the housing, and a easily removable mulch plate held in a dual channel receiver mounting system to cover and uncover the discharge opening respectively to mulch and discharge the cuttings. The mower discharge door or mulch plate attachment system is easily retrofitable to older mowers of the above mentioned design as well as capable of being included in a new mower design. The mulch plate is fitted with a handle that is used to easily install or remove it. The design of the handle allows it to act as a positive placement device which secures it at the proper height on the discharge of the mower deck. The present invention also incorporates a curved mulch plate which helps to keep the grass in motion which aids in cutting it into fine pieces before it drops to the ground.

20 Claims, 2 Drawing Sheets

MOWER DISCHARGE SLIDING DOOR

BACKGROUND OF THE INVENTION

1. Field of the Invention

This invention relates generally to an improvement to a removable mulching plate discharge door for industrial grade power lawn mowers.

2. Description of the Prior Art

Industrial grade power mowers are well known and they may be of the walk behind or ride on type. The cutting swath varies and those with a 52 inch and a 61 inch are quite common whereby the 52 inch is a walk behind and the 61 inch a ride on mower. The housing of these mowers have a discharge opening in a side of the housing that presently require an operator to physically relocate themselves to the discharge opening to change from mulching and discharging the cuttings.

In these mowers the cuttings discharge opening is located forwardly, laterally and downwardly from where the operator is located during cutting. The distance from the operator will vary depending upon the size and/or type of mower. During cutting ground and/or cutting conditions can vary considerably making it desirable to switch from one to the other of mulching and discharging the cuttings and to do so during the mowing operation quickly and easily. This invention provides a solution for easy retrofit of old mowers or to be incorporated into a new mower design.

There is also a safety issue in the cutting discharge mode in that stones and the like objects can be propelled through the discharge opening by the cutting element. The presence of others or in the case of being in close quarters to building structures it is desirable to cover the discharge opening to prevent harm.

SUMMARY OF INVENTION

The present invention is a discharge door or mulch plate for an industrial grade mower that has a cutting blade rotating in horizontal plane under an inverted dish like housing that has a cuttings discharge opening in a side wall of the housing. The removable mulch plate is held in a dual channel receiver mounting system to cover and uncover the discharge opening respectively to mulch and discharge the cuttings. The attachment system is easily retrofitable to older mowers of the above mentioned design as well as capable of being included in a new mower design. The mulch plate is fitted with a handle that is used to easily install or remove it. The design of the handle allows it to act as a positive placement device which secures it at the proper height on the discharge of the mower deck. The present invention also incorporates a curved mulch plate which helps to keep the grass in motion which aids in cutting it into fine pieces before it drops to the ground. Other designs use a flat plate which prevents the discharge of clippings but leaves corners inside the mower deck which gather undesirable clumps of clippings which subsequently fall to the ground in large pieces and cause a mess on the lawn.

This invention relates generally to an improvement to a removable mulching plate discharge door for industrial grade power lawn mowers having an inverted dish like housing with one or more cutting blades thereunder which, during cutting, rotate in a horizontal plane and discharge the cuttings through an opening in a side wall of the housing. The improvement provides for an assembly for mounting a pair of power mower channel shaped brackets into which the mulch plate slides and is held in place by gravity. The height of the plate is maintained by the handle coming into contact with the mower deck. Moreover, this design may be fabricated as a kit and retrofitted onto an old mower of the proper design. Furthermore, newly manufactured mowers may be fabricated including the assembly enabling the operator to easily insert or remove the mulch plate by simply lifting it out of the channel brackets. Equally important to the design is the curved shape of the mulch plate which enhances mulching and prevents the grass from clumping up under the deck and eventually falling out and making a mess on the mown yard (as with other designs that employ a flat plate rather than one curved to blend in with the shape of the mower deck).

An object of the present invention is to provide an easily removable mulch plate assembly for mounting to or being incorporated with an industrial type power mower.

A further object of the present invention is to provide the foregoing in which the mower is a side discharge type with the discharge opening located forwardly, laterally and downwardly from the mower operator.

Another object of the present invention is to provide a mulching plate assembly which is can be easily retrofitted to a mower as well as a design which can be incorporated into a new mower design.

It is an object of the present invention to provide a removable mulch plate slidably retained within a bracket assembly without the use of clips or tools.

It is another object t of the present invention to provide a removable mulch plate including a curved portion which conforms to the curvature of a mower deck to enhance circulation of the grass clippings and enhancement of the cyclone effect of keeping the clippings where the blades are cutting them rather than allowing the clumping of clippings under the deck at the attachment point of the mulch plate.

Yet another object of the present invention is to provide a design which improves mulching performance by means of the curved shape of the mulch plate which serves to enhance the cyclone effect to keep the clippings in motion until they are cut into small enough pieces rather than allowing clumping of grass clipping under the deck and a subsequent mess on the lawn.

Furthermore, the slidably removable mower discharge door assembly for a power mower having one or more rotatable cutting elements disposed horizontally below an inverted dish like housing defining a mower deck that has a cuttings discharge opening in a side wall of the mower deck and a rigid frame structure includes a slidably removable mulch plate shaped conforming to a curvature of the mower deck. The slidably removable mulch plate includes means for lifting and stop means for position the mulch plate at a selected height with respect to the mower deck discharge opening. A pair of opposing L-shaped brackets mounting, each one mounting on an opposing side edge of the mower deck for slidably holding the removable mulch plate. In a preferred embodiment, the lifting means is a U-shaped handle comprising a rod having central horizontal grip section disposed between a pair of vertically disposed opposing distal ends attached to an interior surface of a the mulch plate. Moreover, The stop means for the mower discharge door assembly is composed of a distal ends of the U-shaped handle abutting a top surface of the mower deck. The mower discharge door assembly can optionally include a slidably removable mulch plate defining a least a portion thereof being a curved portion conforming to a curvature of the mower deck.

The method of use for utilizing the slidably removable mulch plate assembly for improving the circulation of mulching grass using a power mower of having one or more rotatable cutting elements disposed horizontally below an inverted dish like housing defining a mower deck that has a cuttings discharge opening in a side wall of said mower deck and a rigid frame structure, comprises the steps of selecting a slidably removable mulch plate shaped conforming to a curvature of said mower deck having a means for lifting and stop means for cooperatively engaging a top surface of said mower deck; mounting a pair of opposing L-shaped brackets on each one mounting on an opposing side edge of said mower deck; and slidably positioning said removable mulch plate by means for lifting into position within said L-shaped brackets at a selected height with respect to said mower deck discharge opening wherein said stop means abuts and rests upon a top surface of said mower deck.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the several views and wherein.

DESCRIPTION OF THE PREFERRED EMBODIMENTS

Figure 1:
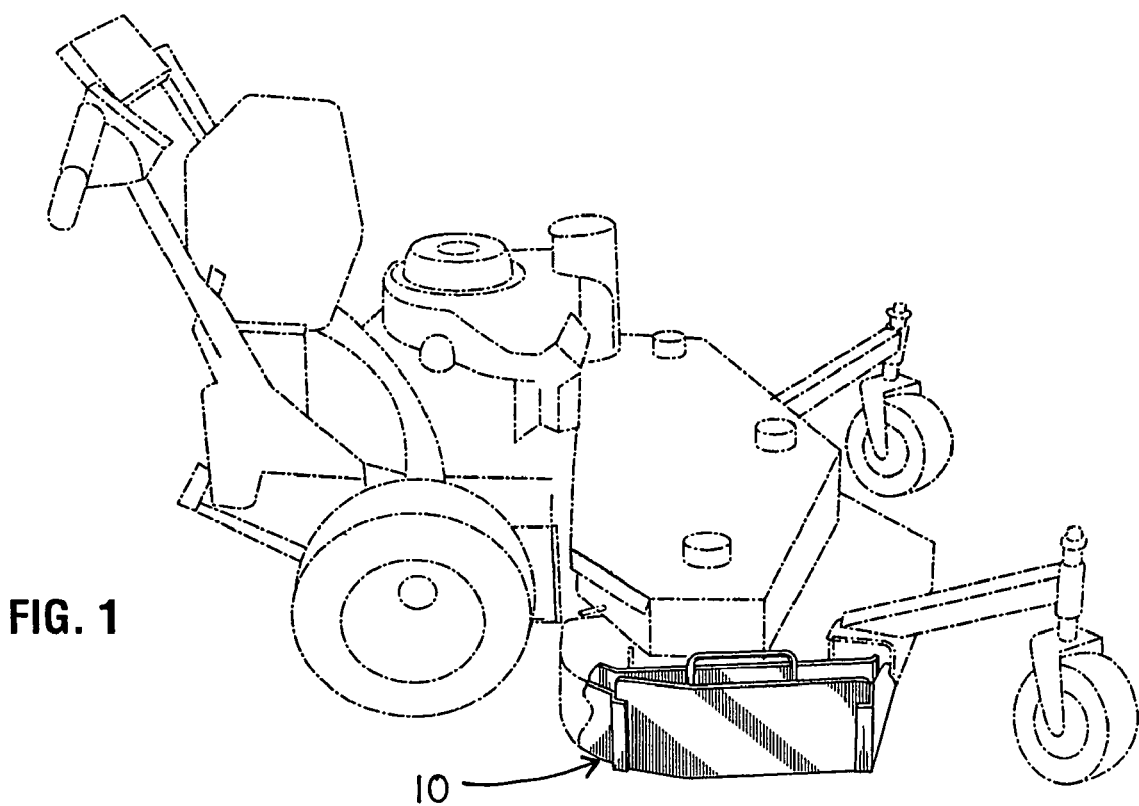
FIG. 1 is an oblique side elevational view of a walk behind swath lawn mower having an assembly of the present invention mounted thereon that includes a discharge opening cover plate.
Figure 2:
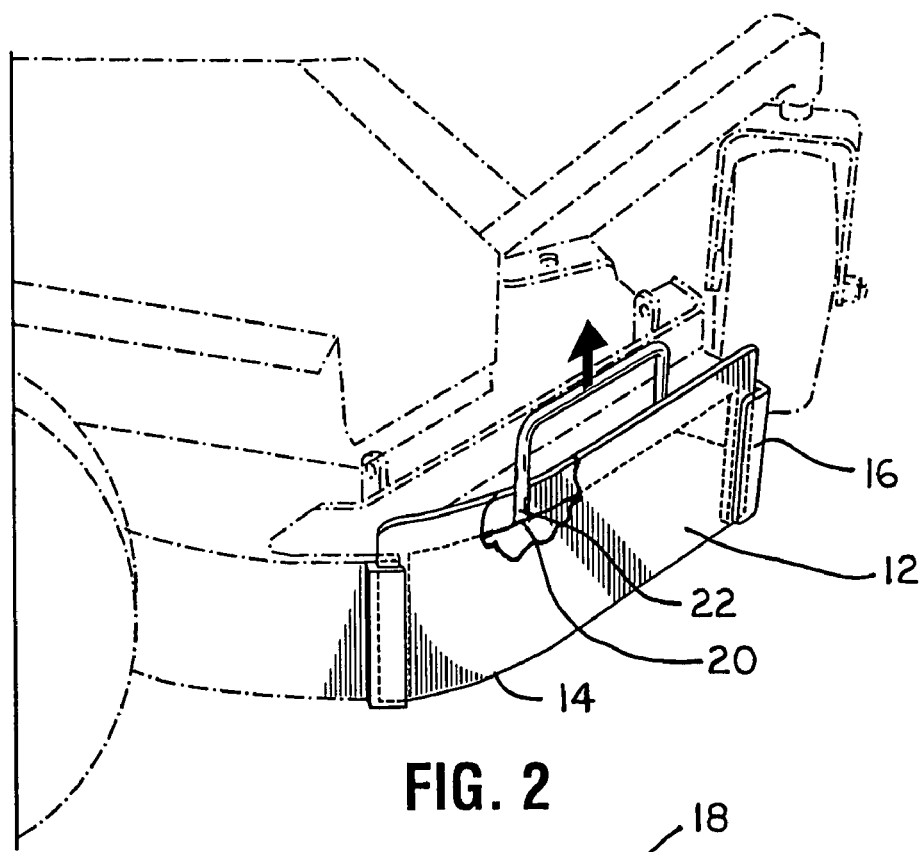
FIG. 2 is a partial perspective view of the discharge door deck section of FIG. 1 showing a ride-on swath lawn mower having the same assembly including a mounting plate and assembly mounting bracket components with the deck shown in phantom lines and showing the mulching plate lift and positioning means in a cutaway view.
Figure 3:
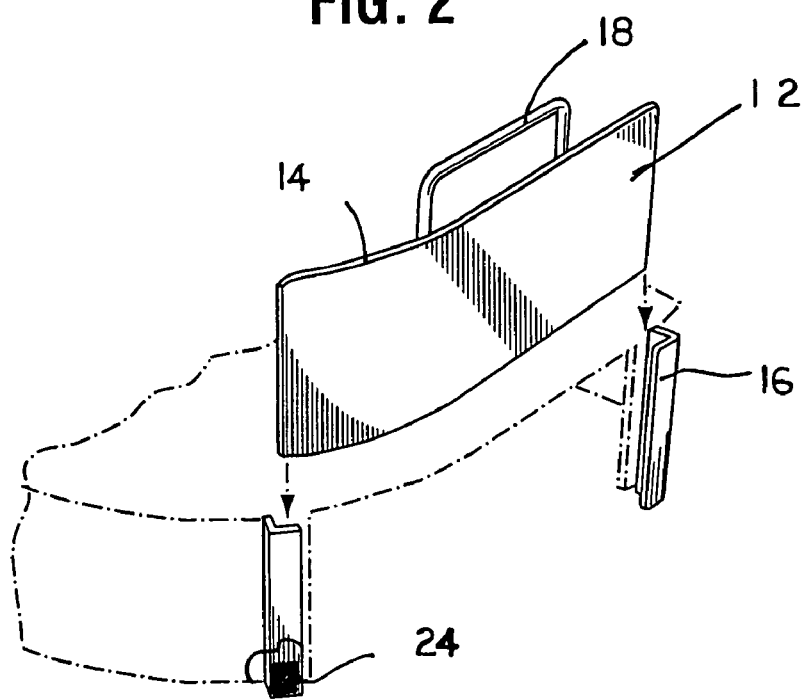
FIG. 3 is an exploded view of the assembly shown in FIG. 2 with a component mounting plate and showing the curved shape which blends in with the deck and supports the grass clipping circulation mulching process as opposed to conventional flat plate attachments utilizing square corners which interfere with the movement of the clippings and encourages clumping of the clippings under the deck.

Referring to the drawings illustrated in FIGS. 1-3, is a 52 inch walk behind lawn mower 10, known commercially under the Trademark 'SCAG', having an assembly of the present invention mounted thereon. The power mower is of the type having one or more rotatable cutting elements disposed horizontally below an inverted dish like housing that has a cuttings discharge opening in a side wall of the housing and a rigid frame structure. The dimensions will vary depending upon the make, model and size of the mower and also can be varied to provide the desired movement characteristics.

A preferred embodiment of the mulch plate assembly 10 is a removable mulch plate 10 comprising a generally rectangular strip of metal formed having a curvature of up to a 90 degree angle at a selected position 14 of about two-thirds of the length of the plate 10 in order that the adapter conform to the mower frame or housing permitting the adapter to be bolted onto the existing mower frame or housing. In one preferred embodiment the angle of radius is up to a 45 degree angle and in another preferred embodiment the angle of radius is up to a 40 degree, and in another preferred embodiment the angle of radius is up to a 35 degree angle, and in another preferred embodiment the angle of radius is up to a 30 degree angle, and in another preferred embodiment the angle of radius is up to a 25 degree angle, and in another preferred embodiment the angle of radius is up to a 20 degree angle, and in another preferred embodiment the angle of radius is up to a 15 degree angle, and in another preferred embodiment the angle of radius is up to a 10 degree angle, and in another preferred embodiment the angle of radius is up to a 5 degree angle, The mulch plate assembly includes at least one pair of opposing vertically oriented L-shaped holding members 16 held on the the mower deck on each side of the opening by retaining means such as bolts, screws, rivets, pins, welding, or other means. It is contemplated that the L-shaped brackets extend the depth of the mower deck or a selected portion thereof. It is also contemplated that the holding members comprise a plurality of L-shaped projections disposed vertically along the deck opening.

Means for lifting, holding and positioning the mulch plate 12 defining a lifting member 18 is attached to the mulch plate 12 and held in position with respect to the mower deck is shown as a generally U-shaped handle 18 comprising a U-shaped rod mounted to the top portion of the mulch plate 12 by suitable means such by welding or studs or bolt and nut units on the frame of a ride on mower. The plate 12 is disposed so that the handle 18 of the mulch plate 12 is within easy reach of the mower operator. The rigid plate 12 maybe metal, fiberglass, or made of another synthetic material. A preferred embodiment includes at least one and preferably a pair of stop or positioning means 20 integrally formed from distal ends 22 of the rod forming the handle 12 extending vertically downward on the interior concave surface of the mulch plate 12 to abut and corporately engage the top of the mower deck. This stop means rod or pin 22 is suitably located so as to hold the door in the downward closed position.

Thus the mulch plate door 12 which is removable and installed by a handle which simultaneously serves to regulate the height of said door in the closed downward position.

The door 12 is constructed in a curved shaped so as to improve mulching and mowing performance due to enhancement of the cyclone effect of keeping the clippings where the blades are cutting them rather than allowing the clumping of clippings under the deck.

It is contemplated that notches may be incorporated into the handle providing a plurality of stop means 22 for selectively positioning the mulching plate 12. Alternatively, spacer means 24 can be inserted into or removed from the L-shaped brackets 16 in order to raise or lower the mulch plate 12 slidably within the brackets.

The foregoing detailed description is given primarily for clearness of understanding and no unnecessary limitations are to be understood therefrom, for modifications will become obvious to those skilled in the art based upon more recent disclosures and may be made without departing from the spirit of the invention and scope of the appended claims.

I claim:

1. A mower discharge door assembly for a power mower of the type having one or more rotatable cutting elements disposed horizontally below an inverted dish like housing defining a mower deck that has a cuttings discharge opening in a side wall of said mower deck and a rigid frame structure, comprising:

a slidably removable mulch plate shaped conforming to a curvature of said mower deck;

said slidably removable mulch plate including means for lifting and stop means for position said mulch plate at a selected height with respect to said mower deck discharge opening;

a pair of opposing L-shaped brackets mounting, each one mounting on an opposing side edge of said mower deck for slidably holding said removable mulch plate.

2. The mower discharge door assembly of claim 1, wherein said lifting means is a U-shaped handle comprising a rod having central horizontal grip section disposed between a pair of vertically disposed opposing distal ends attached to an interior surface of said mulch plate.

3. The mower discharge door assembly of claim 2, wherein said stop means comprise the distal ends of said U-shaped handle abutting a top surface of said mower deck.

4. The mower discharge door assembly of claim 1, wherein said slidably removable mulch plate includes a curved portion conforming to a curvature of said mower deck.

5. The mower discharge door assembly of claim 4, wherein said curved portion comprises a radius of up to 90 degrees.

6. The mower discharge door assembly of claim 4, wherein said curved portion comprises a radius of up to 45 degrees.

7. The mower discharge door assembly of claim 4, wherein said curved portion comprises a radius of up to 40 degrees.

8. The mower discharge door assembly of claim 4, wherein said curved portion comprises a radius of up to 35 degrees.

9. The mower discharge door assembly of claim 4, wherein said curved portion comprises a radius of up to 90 degrees at a selected position of about two-thirds of the length of the slidably removable mulch plate.

10. The mower discharge door assembly of claim 4, wherein said curved portion comprises a radius of up to 30 degrees.

11. The mower discharge door assembly of claim 4, wherein said curved portion comprises a radius of up to 25 degrees.

12. The mower discharge door assembly of claim 4, wherein said curved portion comprises a radius of up to 20 degrees.

13. The mower discharge door assembly of claim 4, wherein said curved portion comprises a radius of up to 15 degrees.

14. The mower discharge door assembly of claim 4, wherein said curved portion comprises a radius of up to 10 degrees.

15. The mower discharge door assembly of claim 4, wherein said curved portion comprises a radius of up to 5 degrees.

16. The mower discharge door assembly of claim 4, wherein said curved portion comprises a radius of from 5 to 35 degrees.

17. The mower discharge door assembly of claim 1, wherein said lift means and said stop means are integral formed from a single unit.

18. The mower discharge door assembly of claim 1, including the stop means insertable within said L-shaped bracket.

19. A method for improving the circulation of mulching grass using a power mower of having one or more rotatable cutting elements disposed horizontally below an inverted dish like housing defining a mower deck that has a cuttings discharge opening in a side wall of said mower deck and a rigid frame structure, comprising the steps of:

selecting a slidably removable mulch plate shaped conforming to a curvature of said mower deck having a means for lifting and stop means for cooperatively engaging a top surface of said mower deck;

mounting a pair of opposing L-shaped brackets on each one mounting on an opposing side edge of said mower deck; and slidably positioning said removable mulch plate by means for lifting into position within said L-shaped brackets at a selected height with respect to said mower deck discharge opening wherein said stop means abuts and rests upon the top surface of said mower deck.

20. The method of claim 19, wherein said lifting means is a U-shaped handle comprises a rod having central horizontal grip section disposed between a pair of vertically disposed opposing distal ends attached to an interior surface of said mulch plate.

* * * * *